(12) United States Patent
Nakanishi (10) Patent No.: US 11,133,695 B2
(45) Date of Patent: Sep. 28, 2021

(54) CONTROL DEVICE, ELECTRONIC DEVICE, AND CONTROL METHOD

(71) Applicant: SHARP KABUSHIKI KAISHA, Sakai (JP)

(72) Inventor: Yuhtaroh Nakanishi, Sakai (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 140 days.

(21) Appl. No.: 16/569,143

(22) Filed: Sep. 12, 2019

(65) Prior Publication Data

US 2020/0099247 A1 Mar. 26, 2020

(30) Foreign Application Priority Data

Sep. 25, 2018 (JP) .............................. JP2018-179160

(51) Int. Cl.
*H02J 7/04* (2006.01)
*H02J 7/00* (2006.01)
*H01M 10/44* (2006.01)
*H01M 10/623* (2014.01)

(52) U.S. Cl.
CPC ..... *H02J 7/007192* (2020.01); *H01M 10/443* (2013.01); *H01M 10/623* (2015.04); *H02J 7/0027* (2013.01)

(58) Field of Classification Search
None
See application file for complete search history.

(56) References Cited

U.S. PATENT DOCUMENTS

| 6,029,119 A | 2/2000 | Atkinson | |
|---|---|---|---|
| 2014/0070761 A1* | 3/2014 | Labbe | A61N 1/3787 320/108 |
| 2017/0222465 A1* | 8/2017 | Hawley | H02J 7/0047 |

FOREIGN PATENT DOCUMENTS

| JP | 2007-166774 A | 6/2007 |
|---|---|---|
| JP | 2007-323678 A | 12/2007 |

\* cited by examiner

*Primary Examiner* — Arun C Williams
(74) *Attorney, Agent, or Firm* — ScienBiziP, P.C.

(57) ABSTRACT

It is possible to prevent user's convenience from decreasing during charging. A control device includes a current level adjusting section that adjusts, in accordance with temperatures detected at a plurality of locations in a mobile terminal, output current levels of output currents to be outputted from respective plurality of charging circuits, i.e. first to fourth charging circuits.

4 Claims, 5 Drawing Sheets

| | MEASUREMENT RESULTS OBTAINED BY TEMPERATURE SENSORS | | | | | TEMPERATURE RATIOS WITH RESPECT TO AVERAGE VALUES | | | |
|---|---|---|---|---|---|---|---|---|---|
| | FIRST TEMPERATURE SENSOR | SECOND TEMPERATURE SENSOR | THIRD TEMPERATURE SENSOR | FOURTH TEMPERATURE SENSOR | AVERAGE VALUE | FIRST TEMPERATURE SENSOR | SECOND TEMPERATURE SENSOR | THIRD TEMPERATURE SENSOR | FOURTH TEMPERATURE SENSOR |
| INITIAL STATE | | don't care | | | | | don't care | | |
| 1st TIME | 25 | 25 | 25 | 25 | 25 | 1 | 1 | 1 | 1 |
| 2nd TIME | 80 | 30 | 25 | 25 | 40 | 2 | 0.75 | 0.625 | 0.625 |
| 3rd TIME | 70 | 30 | 30 | 30 | 40 | 1.75 | 0.75 | 0.75 | 0.75 |
| 4th TIME | 50 | 40 | 40 | 35 | 40 | 1.25 | 1 | 1 | 0.875 |
| 5th TIME | 45 | 43 | 42 | 30 | 40 | 1.125 | 1.075 | 1.05 | 0.75 |
| 6th TIME | 41 | 41 | 41 | 41 | 40 | 1.025 | 1.025 | 1.025 | 1.025 |
| 7th TIME | 40 | 40 | 40 | 40 | 40 | 1 | 1 | 1 | 1 |

| | RECIPROCALS OF TEMPERATURE RATIOS (WEIGHTING VALUE:3) | | | | | DISTRIBUTION RATIOS CALCULATED FROM RECIPROCALS OF TEMPERATURE RATIOS | | | | |
|---|---|---|---|---|---|---|---|---|---|---|
| | FIRST TEMPERATURE SENSOR | SECOND TEMPERATURE SENSOR | THIRD TEMPERATURE SENSOR | FOURTH TEMPERATURE SENSOR | SUM | FIRST CHARGING CIRCUIT | SECOND CHARGING CIRCUIT | THIRD CHARGING CIRCUIT | FOURTH CHARGING CIRCUIT | SUM |
| INITIAL STATE | | | | | | | | | | |
| 1st TIME | 1 | 1 | 1 | 1 | 4 | 0.25 | 0.25 | 0.25 | 0.25 | 1 |
| 2nd TIME | 0.125 | 2.37037 | 4.096 | 4.096 | 10.68737 | 0.011696 | 0.221792 | 0.383256 | 0.383256 | 1 |
| 3rd TIME | 0.186589 | 2.37037 | 2.37037 | 2.37037 | 7.2977 | 0.025568 | 0.324811 | 0.324811 | 0.324811 | 1 |
| 4th TIME | 0.512 | 1 | 1 | 1.492711 | 4.497423 | 0.113843 | 0.22235 | 0.22235 | 0.331904 | 1 |
| 5th TIME | 0.702332 | 0.804961 | 0.863838 | 2.37037 | 4.741501 | 0.148124 | 0.169769 | 0.182187 | 0.49992 | 1 |
| 6th TIME | 0.928599 | 0.928599 | 0.928599 | 1.263499 | 4.049297 | 0.229324 | 0.229324 | 0.229324 | 0.312029 | 1 |
| 7th TIME | 1 | 1 | 1 | 1 | 4 | 0.25 | 0.25 | 0.25 | 0.25 | 1 |

FIG. 5

CONTROL DEVICE, ELECTRONIC DEVICE, AND CONTROL METHOD

This Nonprovisional application claims priority under U.S.C. § 119 on Patent Application. No. 2018-179160 filed in Japan on Sep. 25, 2018, the entire contents of which are hereby incorporated by reference.

TECHNICAL FIELD

The present invention relates to a control device and the like for controlling supply of currents to a battery.

BACKGROUND ART

The technique relating to a measure against heat generation of an electronic device is disclosed in, for example, Patent Literatures 1 and 2. Patent Literature 1 discloses a mobile electronic device that, in a case where the mobile electronic device changes its state into an operating state other than a standby state, carries out switching to a charging current value which is lower than a charging current value specified for a standby state. Patent Literature 2 discloses a temperature management system that controls the temperature of a computer appropriately by controlling a cooling option based on a temperature detected by a thermistor and a plurality of indirect inputs.

CITATION LIST

Patent Literatures

[Patent Literature 1]
Japanese Patent Application Publication Tokukai No. 2007-166774
[Patent Literature 2]
Japanese Patent Application Publication Tokukai No. 2007-323678

SUMMARY OF INVENTION

Technical Problem

Unfortunately, the technique disclosed in Patent Literature 1 limits the operation of the mobile electronic device such that a charging current outputted from a charge control circuit is decreased to reduce heat generation during charging. The technique disclosed in Patent Literature 2 also limits some kind of operation of the computer to reduce heat generation. As such, the conventional techniques limit the operations of the electronic devices due to heat generation and thus raise the possibility of decreasing user's convenience.

It is an object of an aspect of the present invention to achieve a control device and the like that make it possible to prevent user's convenience of an electronic device from decreasing during charging.

Solution to Problem

In order to solve the above problem, a control device in accordance with an aspect of the present invention is a control device for controlling supply of currents to a battery, including: a current level adjusting section configured to adjust, in accordance with temperatures detected at a plurality of locations in an electronic device which includes the battery and a plurality of charging circuits, output current levels of output currents to be outputted from the respective plurality of charging circuits, the plurality of charging circuits each being configured to charge the battery.

Further, in order to solve the above problem, a control method in accordance with an aspect of the present invention is a control method of controlling supply of currents to a battery, including the steps of: (a) detecting temperatures at a plurality of locations in an electronic device which includes the battery and a plurality of charging circuits, the plurality of charging circuits each being configured to charge the battery; and (b) adjusting, in accordance with the temperatures having been detected in the step (a), current levels of output currents to be outputted from the respective plurality of charging circuits.

Advantageous Effects of Invention

According to an aspect of the present invention, it is possible to prevent user's convenience of an electronic device from decreasing during charging.

BRIEF DESCRIPTION OF DRAWINGS

FIG. 4 is a diagram illustrating an example distribution ratio calculation carried out by a control device.

DESCRIPTION OF EMBODIMENTS

Embodiment 1

The following description will discuss an embodiment in accordance with the present invention in detail with reference to FIGS. 1 to 4.

<Example Layout of Components of Mobile Terminal>

Figure 2:
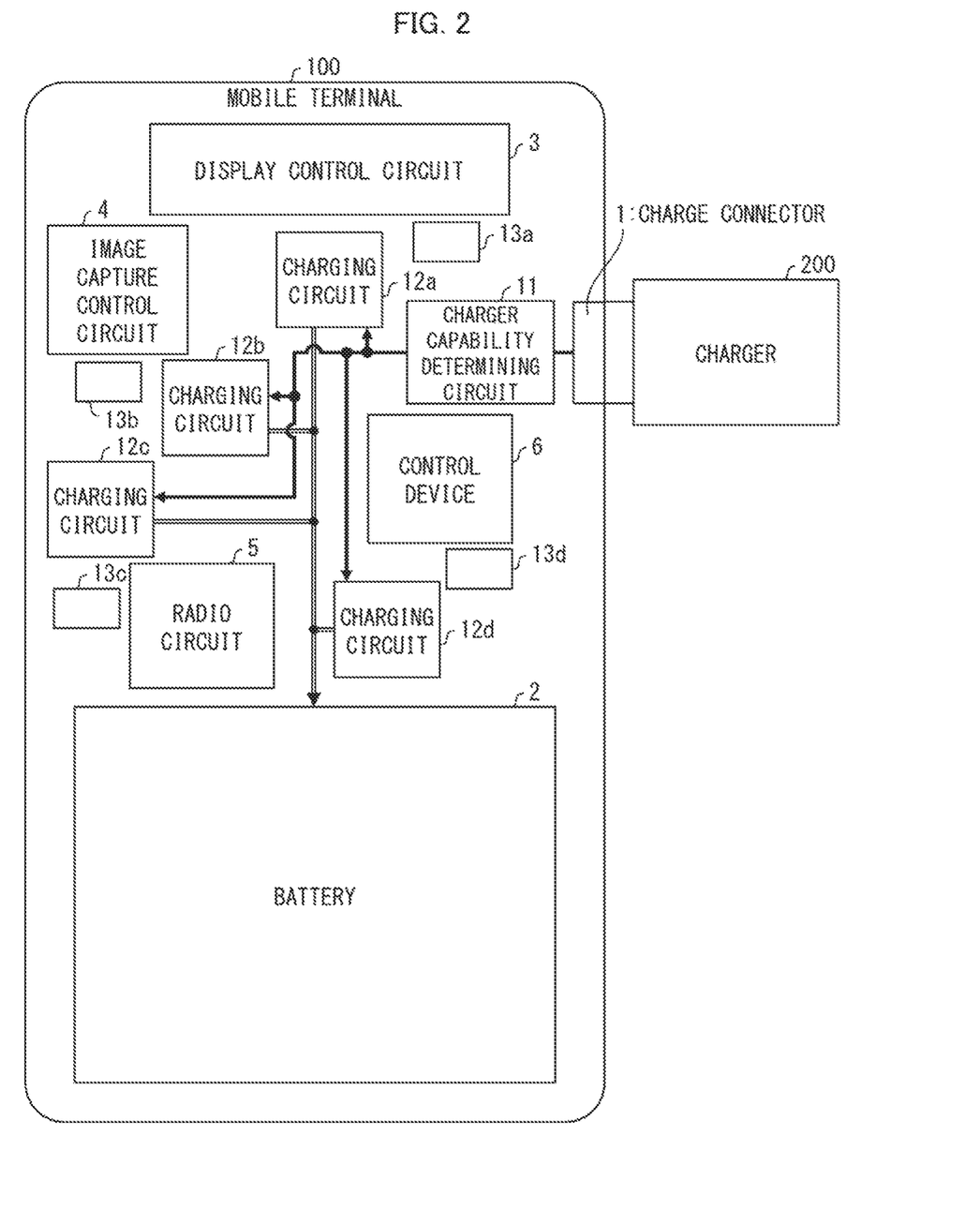
FIG. 2 is a block diagram illustrating an example internal configuration of the mobile terminal.

First, the following will describe an example internal configuration of a mobile terminal 100 (electronic device) with reference to FIG. 2. FIG. 2 is a block diagram illustrating an example internal configuration of the mobile terminal 100. Note that FIG. 2 is a view used for reference to explain that temperature sensors are placed in the vicinities of components which serve as heat sources, and types and layout of the components (members) illustrated in FIG. 2 are merely examples.

The mobile terminal 100 is a mobile information processing terminal (e.g., a multifunction information processing terminal such as a smartphone and a tablet), and includes, for example, a display section, an operating section, and an image capturing section (which are not illustrated). The mobile terminal 100 further includes, in its inside, a charge connector 1, a battery 2, a display control circuit 3, an image capture control circuit 4, a radio circuit 5, and a control device 6 (see FIG. 2).

The charge connector 1 is a connecting terminal to which the charger 200 is to be connected. While the charger 200 is connected to the charge connector 1, the charge connector 1 supplies, to the battery 2, a current (charge current) supplied from the charger 200. The battery 2 is a storage battery (secondary battery) that stores the current from the charger 200 to operate the components (e.g., the display control circuit 3, the image capture control circuit 4, the radio circuit 5, and the control device 6) of the mobile terminal 100. The display control circuit 3 carries out image display control over the display section. The image capture control circuit 4 carries out image capture control over the image capturing section. The radio circuit 5 carries out data communications with an external device via a wireless medium. The control device 6 centrally controls the components of the mobile terminal 100 and is implemented by, for example, a central processing unit (CPU).

The mobile terminal 100 further includes a charger capability determining circuit 11. The charger capability determining circuit 11, which is a circuit for determining what degree of current supply capability the charger 200 connected to the charge connector 1 has, specifies a maximum current level of a current to be taken from the charger 200. Further, the charger capability determining circuit 11 divides the maximum current level into current levels in accordance with distribution ratios (described later), which have been calculated by the control device 6, and then supplies, to respective charging circuits, input currents in the current levels obtained by the division as input current levels.

Further, the mobile terminal 100 includes a plurality of charging circuits, i.e. a first charging circuit 12a, a second charging circuit 12b, a third charging circuit 12c, and a fourth charging circuit 12d. Still further, the mobile terminal 100 includes a plurality of temperature sensors (temperature detecting section), a first temperature sensor 13a, a second temperature sensor 13b, a third temperature sensor 13c, and a fourth temperature sensor 13d. Note that the above-described charging circuits can also be referred to as "charging circuits 12", and the above-described temperature sensors can also be referred to as "temperature sensors 13".

Each of the plurality of charging circuits 12 converts the input current level of the input current having been supplied thereto from the charger capability determining circuit 11 into an output current level of an output current which is available for supply to the battery 2, and then supplies, to the battery 2, the output current in the output current level. In FIG. 2, current paths from the charger capability determining circuit 11 to the charging circuits 12 are indicated by bold arrows, while current paths from the charging circuits 12 to the battery 2 are indicated by doublet arrows. This also applies to FIG. 1.

In Embodiment 1, the plurality of charging circuits 12 are independently placed in the vicinities of the display control circuit 3, the image capture control circuit 4, the radio circuit 5, and the control device 6. That is, in Embodiment 1, the plurality of charging circuits 12 are provided away from each other. This makes it possible to prevent or reduce a heat spot where a large amount of heat is locally generated due to the configuration in which the plurality of charging circuits 12 are provided densely.

Note that in Embodiment 1, the number of the plurality of charging circuits 12 is the same as the number of the temperature sensors 13 (In this example, four charging circuits 12 and four temperature sensors 13 are provided). However, the number of the plurality of charging circuits 12 is adjusted as appropriate according to the size of an area where the components of the mobile terminal. 100 are arranged.

A plurality of temperature sensors 13 are placed inside the mobile terminal 1 at different locations and are configured to detect temperatures of surrounding areas of the respective temperature sensors 13. Further, the plurality of temperature sensors 13 are placed in vicinities of the components which are heat sources. In Embodiment 1, the plurality of temperature sensors 13 are placed in vicinities of the heat sources, i.e. the display control circuit 3, the image capture control circuit 4, the radio circuit 5, and the control device 6. Note that the plurality of temperature sensors 13 only need be placed in vicinities of at least two components which are heat sources. For example, in placing the temperature sensors 13, a priority may be given to the vicinity of a component that tends to have a relatively high temperature and tends to affect the operation of the mobile terminal 100.

Further, not only the above-described components, but also other various components (e.g., the battery 2, the charger capability determining circuit 11, and the charging circuit 12) included in the mobile terminal 100 can be heat sources. Thus, the temperature sensors 13 may be provided in vicinities of, for example, the battery 2, the charger capability determining circuit 11, and the charging circuit 12.

The temperatures detected by the temperature sensors 13 are used to adjust output current levels of the respective charging circuits 12 during charging of the battery 2. Thus, each of the temperature sensors 13 carries out a temperature detection operation during charging.

<Example Mobile Terminal Configuration Concerned with Charging>

Figure 1:
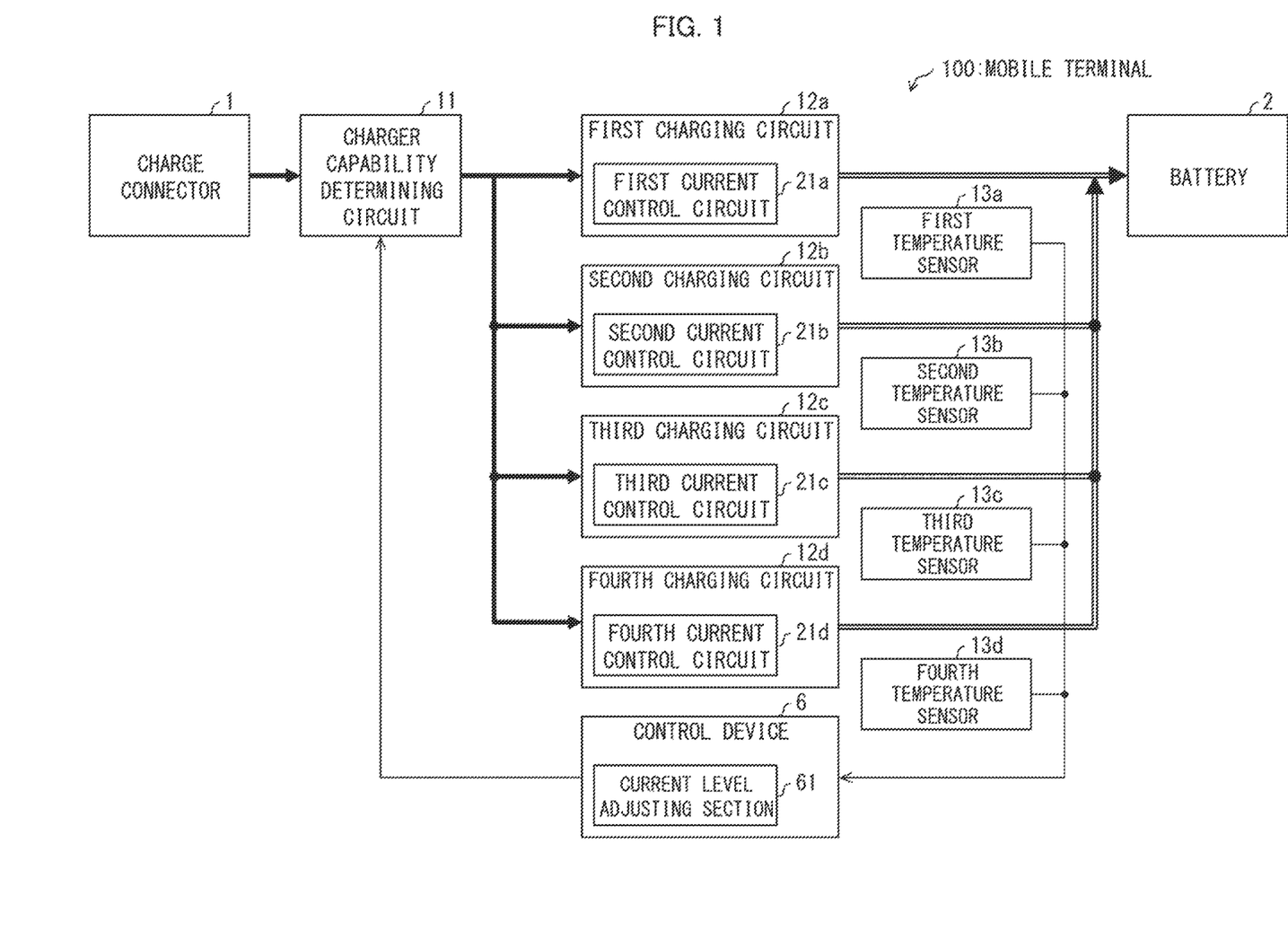
FIG. 1 is a block diagram illustrating an example configuration of a mobile terminal concerned with charging of a battery.

Next, the following will describe an example configuration of the mobile terminal 100 concerned with charging of the battery 2 with reference to FIG. 1. FIG. 1 is a block diagram illustrating an example configuration of the mobile terminal 100 concerned with charging of the battery 2. As illustrated in FIG. 1, a first charging circuit 12a, a second charging circuit 12b, a third charging circuit 12c, and a fourth charging circuit 12d include a first current control circuit 21a, a second current control circuit 21b, a third current control circuit 21c, and a fourth current control circuit 21d, respectively. The first current control circuit 21a to the fourth current control circuit 21d can also be referred to as "current limiting circuits 21"

Each of the current limiting circuits 21 converts the input current level of an input current having been supplied thereto from the charger capability determining circuit 11 into an output current level of an output current which is available for supply to the battery 2. Specifically, each of the current limiting circuits 21 is a DC/DC converter that converts an operation voltage (e.g., 5 V) of the charger 200 into a charging voltage (e.g., 4.4 V) of the battery 2. Each of the current limiting circuits 21 converts the above current level by carrying out the above-described voltage conversion.

Further, the control device 6 includes the current level adjusting section 61. The current level adjusting section 61 may be a functional block whose function is realized by the control device 6 as a CPU or may be a logic circuit included in the control device 6.

The current level adjusting section 61 adjusts, in accordance with temperatures detected at a plurality of locations in the mobile terminal 100, output current levels of output currents to be outputted from the respective plurality of charging circuits 12, in order not to limit the operation of the mobile terminal 100.

Specifically, as illustrated in FIG. 1, the current level adjusting section 61 obtains temperature data (detection results) indicative of temperatures detected by the respective plurality of temperature sensors 13 at intervals of, for example, a predetermined time period. The current level adjusting section 61 calculates distribution ratios of input current levels of input currents distributed to the respective charging circuits 12 in accordance with the temperatures of which the temperature data thus obtained is indicative, and then transmits distribution ratio data indicative of the distribution ratios thus calculated to the charger capability determining circuit 11. The charger capability determining circuit 11 determines the input current levels of the respective charging circuits 12 in accordance with the distribution ratios indicated by the distribution ratio data, and then supplies input currents in the determined input current levels to the respective charging circuits 12. The current limiting circuits 21 of the charging circuits 12 each convert an input current level into an output current level and then supplies an output current in the output current level to the battery 2. That is, the current level adjusting section 61 adjusts input current levels and output current levels (i.e., charging current levels) for the respective charging circuits 12 according to temperatures detected by the respective plurality of temperature sensors 13.

Here, as in the case of the conventional mobile terminal, a case where only one charging circuit is located will be considered with reference to FIG. 2. For example, in a case where a charging circuit is located in the vicinity of the radio circuit (in FIG. 2, such a charging circuit corresponds to the third charging circuit 12c), data communication during charging causes heat generation in the radio circuit and in the charging circuit, thereby causing a heat spot in the radio circuit. Similarly, for example, in a case where a charging circuit is located in the vicinity of the image capture control circuit (in FIG. 2, such a charging circuit corresponds to the second charging circuit 12b), operating the image capture control circuit during charging causes heat generation in the image capture control circuit and in the charging circuit, thereby causing a heat spot in the image capture control circuit. In this way, a spot where heat is generated varies depending on an operating state (operation mode) of the mobile terminal.

Thus, in a case where the mobile terminal is operated during charging, it is common that a charging current level (charging current value) of a charging current to be supplied to a battery is limited according to an operation mode in order to reduce heat generation caused by the charging (for example, the technique in Patent Literature 1). Alternatively, it can be considered to limit a predetermined operation (e.g., a displaying operation or an image capture operation) or a clock frequency while the charging current level is maintained. That is, a common mobile terminal limits some kind of operation of the mobile terminal to reduce heat generation caused by charging and thus raises the possibility of decreasing user's convenience.

Further, it is possible to reduce generation of heat spot by placing the charging circuit in such a position that is not affected by heat generation of the components. However, because of a limited area in which the charging circuit is placed, it is impractical to place the charging circuit in such a position that is not affected by all of the components. The mobile terminal includes various kinds of components, and as discussed earlier, a component which causes heat generation varies depending on an operation mode. Thus, it is difficult to reduce heat generation during charging by placing the charging circuit.

As described above, the mobile terminal 100 in accordance with Embodiment 1 has a plurality of charging circuits 12 placed therein and thus has a plurality of current paths (charging paths) (multipath). Then, in the control device 6, the current level adjusting section 61 adjusts, in accordance with temperatures detected at a plurality of locations in the mobile terminal 100, output current levels of the respective plurality of charging circuits 12, in order not to limit the operation of the mobile terminal 100. In other words, the current level adjusting section 61 adjusts (controls dynamically), in accordance with the detected temperatures, current levels of currents to be flown over the plurality of current paths, in order not to limit the operation of the mobile terminal 100. Thus, the mobile terminal 100 can reduce heat generation caused by charging, without the need to limit the operations of the mobile terminal 100, including a limitation to a current and limitations to the operations of the components (device operation limitations). Thus, it is possible to prevent user's convenience of the mobile terminal 100 from decreasing due to heat generation during charging.

The current level adjusting section 61 is specifically configured to adjust the output current levels such that (i) a charging circuit 12 located closest to a location where the temperature is relatively high outputs a relatively low level of output current and (ii) a charging circuit 12 located closest to a location where the temperature is relatively low outputs a relatively high level of output current. That is, the current level adjusting section 61 adjusts the output current levels such that (i) the current level of a current flown over the current path of the charging circuit 12 which is located closest to a location where the temperature is relatively low is set to be high on a priority basis, and (ii) the current level of a current flown over the current path of the charging circuit 12 which is located closest to a location where the temperature is relatively high is set to be low.

Since a lower current level is set for a location where the temperature is higher, it is possible to reduce heat generation at such a location. Thus, it is not necessary to carry out any operation limitation to a component located at that location due to heat generation caused by charging. Further, since a higher current level is set for a location where the temperature is lower, it is possible to keep constant the total output current level of output currents to be supplied to the battery 2. Thus, it is possible to reduce local heat generation during charging when the mobile terminal 100 is in any operation mode, and it is possible to avoid the operation limitation to the mobile terminal 100, including reduction of the output current level.

In order to achieve the output current level adjustment as described above, the current level adjusting section 61 carries out, for example, the following process. Specifically, the current level adjusting section 61 calculates, on an individual temperature sensor 13 basis, temperature ratios, which are ratios of temperatures indicated by the temperature data obtained from the temperature sensors 13 with respect to an average value of those temperatures. The average value is, in other words, (the sum of the temperatures detected by the temperature sensors 13)/(the number of the temperature sensors 13). Then, the current level adjusting section 61 calculates, for the respective charging circuits 12, distribution ratios of currents to be distributed from the charger 200 (specifically, the charger capability determining circuit 11) to the charging circuits 12, which ratios are ratios of reciprocals of the temperature ratios thus calculated with respect to a sum of the reciprocals of the temperature ratios. Then, the current level adjusting section 61 transmits, to the charger capability determining circuit 11, distribution ratio data indicative of the distribution ratios thus calculated, thereby adjusting the input current levels and output current levels for the respective charging circuits 12 in accordance with the distribution ratios. This allows the individual charging circuits 12 to supply, to the battery 2, output currents in output current levels which are determined in accordance with the distribution ratios having been calculated in accordance with the temperature ratios.

Here, the temperature sensors 13 and the charging circuits 12 are brought into correspondence with each other. That is, the distribution ratios calculated in accordance with the temperature data of the temperature sensors 13 are used to determine the input current levels for the charging circuits 12 which are brought into correspondence with the temperature sensors 13. Specifically, temperature data indicative of a temperature detected by the first temperature sensor 13a is used to calculate a distribution ratio for determining an input current level for the first charging circuit 12a, which is located closest to the first temperature sensor 13a. Similarly, pieces of temperature data obtained by the second temperature sensor 13b to the fourth temperature sensor 13d are used to calculate distribution ratios for determining input current levels for the second charging circuit 12b to the fourth charging circuit 12d, which are located closest to the second temperature sensor 13b to the fourth temperature sensor 13d, respectively.

Further, the current level adjusting section 61 may weight each of the reciprocals of the temperature ratios, in order to optimize the distribution ratios. For example, the number of multiplications of the reciprocal of the temperature ratio calculated can be set as a weighting value. That is, when the weighting value is n, each of the distribution ratios is calculated by {(reciprocal of temperature ration)$^n$/sum of (reciprocals of temperature ratios)$^n$}. Note that in a case where the weighting value is 1, the distribution ratio is calculated as a ratio of the reciprocal of the temperature ratio with respect to the sum of the reciprocals of the temperature ratios, as described above. The weighting value is set, after an experiment or the like, such that a distribution ratio from which an output current level eliminating the need to carry out any operation limitation due to heat generation is calculated.

<Example Process Carried Out by Mobile Terminal During Charging>

Figure 3:
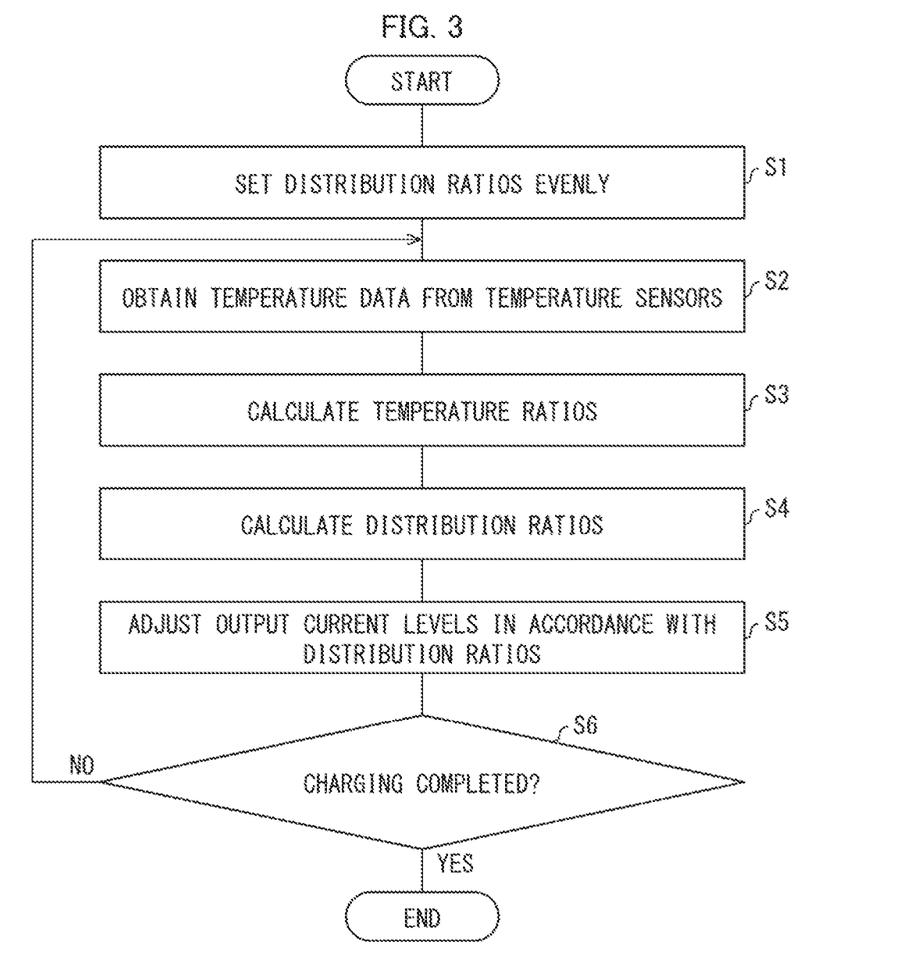
FIG. 3 is a flowchart illustrating an example process carried out by a control device.

Next, the following will describe an example process carried out by the mobile terminal 100 during charging with reference to FIG. 3. FIG. 3 is a flowchart illustrating an example process carried out by the control device 6.

When the charger 200 is connected to the charge connector 1, the current level adjusting section 61 sets the distribution ratios such that the distribution ratios are equal to each other (S1). That is, at this time, the input current levels of the respective charging circuits 12 are equal to each other. Thus, the output current levels of the respective charging circuits 12 are also equal to each other. Note that the distribution ratios may be preset such that the distribution ratios are equal to each other in an initial state (at the start of charging or before the start of charging). When the charger 200 is connected to the charge connector 1, each of the temperature sensors 13 starts a temperature detection operation (each of the temperature sensors 13 is turned on).

The current level adjusting section 61, at a time when a predetermined period of time has elapsed since the start of charging, obtains, from the temperature sensors 13, pieces of temperature data indicative of temperatures detected at that time by the respective temperature sensors 13 (S2). The current level adjusting section 61 calculates temperature ratios, on an individual temperature sensor 13 basis (from the temperatures having been detected by the respective temperature sensors 13), based on the pieces of temperature data obtained from the respective temperature sensors 13 (S3). The current level adjusting section 61 weights reciprocals of the temperature ratios thus calculated and calculates a sum of the reciprocals of the temperature ratios thus weighted. Then, the current level adjusting section 61 calculates, for the respective charging circuits 12, distribution ratios, which are ratios of the reciprocals of the temperature ratios having been weighted with respect to the sum of the reciprocals of the temperature ratios having been weighted (S4). Note, however, that the above-described weighting does not necessarily have to be carried out. The current level adjusting section 61 transmits, to the charger capability determining circuit 11, distribution ratio data indicative of the distribution ratios thus calculated, resulting in adjustment of the output current levels for the respective charging circuits 12 in accordance with the distribution ratios as described above (S5). That is, the charging circuits 12 supply, to the battery 2, output currents in the output current levels which are determined in accordance with the distribution ratios corresponding to the respective charging circuits 12.

Subsequent to S5, the current level adjusting section 61 determines whether charging has been completed (S6). In a case where the current level adjusting section 61 determines that charging has been completed (YES in S6), the control device 6 causes the temperature sensors 13 to stop the temperature detection operations (turns off the temperature sensors 13), and the process ends. In a case where the current level adjusting section 61 determines that charging has not been completed (i.e., charging is in process) (NO in S6), the process returns to S2. At a time when a predetermined period of time has elapsed since the previous temperature data were obtained in S2, the current level adjusting section 61 obtains temperature data again, and carries out S3 to S5. That is, S2 to S5 are carried out until charging is completed.

In this way, a control method, carried out by the control device 6, of controlling supply of currents to the battery 2 includes the current level adjusting step (the above-described step S6) of adjusting the output current levels of the respective charging circuits 12 in accordance with temperatures detected at a plurality of locations in the mobile terminal 100, in order not to limit the operation of the mobile terminal 100. Further, the control method carried out in the mobile terminal 100 includes: the detection step (step which is a premise for S2) of detecting the temperatures at the respective plurality of locations; and the current level adjusting step (the above-described step S6).

Note that the above description assumes that the temperature sensors 13 are turned on at the start of charging and are turned off at the completion of charging. That is, the above description assumes that the temperature sensors 13 detect ambient temperatures at all times during charging. However, the temperature sensors 13 do not necessarily have to detect the ambient temperatures at all times. In this case, the current level adjusting section 61 instructs the temperature sensors 13 to detect temperatures at intervals of a predetermined period of time, so that the temperature sensors 13 detect the temperatures and transmit pieces of temperature data to the current level adjusting section 61. That is, in this case, each of the temperature sensors 13 is turned on upon receipt of the temperature detection instruction and is turned off after having transmitted the temperature data.

<Example Calculation of Distribution Ratios>

Next, the following will describe an example calculation of distribution ratios that contribute to the determination of the output current levels of the respective charging circuits 12 with reference to FIG. 4. FIG. 4 is a diagram illustrating an example distribution ratio calculation carried out by the control device 6. FIG. 4 illustrates an example calculation of distribution ratios at each time in a case where the current level adjusting section 61 obtained temperature data from the temperature sensors 13 seven times at intervals of a predetermined time period from the initial state (the start of charging). Further, the weighting value in this example is set to be 3.

In the initial state, the temperature data are not obtained, and the distribution ratios are set so as to be equal to each other. Thus, each of the distribution ratios for the first charging circuit 12a to the fourth charging circuit 12d is 0.25. As such, in the initial state, when the maximum current level given to the charger capability determining circuit 11 is 4 A (mA), the input current levels of the input currents to be supplied to the first charging circuit 12a to the fourth charging circuit 12d are all A (mA). As a result, the output current levels of the output currents to be outputted from the first charging circuit 12a to the fourth charging circuit 12d are all αA (mA), wherein α is a coefficient determined by DC-DC conversion.

Although the above description discusses the example case where the distribution ratios are set so as to be equal to each other in the initial state, a low output current level may be set for the charging circuit 12 whose temperature is expected to increase up to a point from the initial state.

In a first distribution ratio calculation after a lapse of a predetermined time period from the initial state, the temperatures detected by the first temperature sensor 13a to the fourth temperature sensor 13d are all 25 ('C). As such, the distribution ratios for the first charging circuit 12a to the fourth charging circuit 12d are equal to each other and are all 0.25. Thus, also in this case, the output current levels are all αA (mA).

In a second distribution ratio calculation, the temperatures detected by the first temperature sensor 13a to the fourth temperature sensor 13d are 80 (° C.), 30 (° C.), 25 (° C.), and 25 (° C.), respectively. Thus, the distribution ratios for the first charging circuit 12a to the fourth charging circuit 12d are 0.011696, 0.221792, 0.383256, and 0.383256, respectively. As a result, the output current levels for the first charging circuit 12a to the fourth charging circuit 12d are 0.011696×α×4A, 0.221792×α×4A, 0.383256×α×4A, and 0.383256×α×4A, respectively.

That is, the lowest distribution ratio is calculated for the first charging circuit 12a, which is located closest to the first temperature sensor 13a which has detected the highest temperature, and consequently, the output current level for the first charging circuit 12a becomes the lowest. The highest distribution ratio is calculated for the third charging circuit 12c and the fourth charging circuit 12d, which are located closest to the third temperature sensor 13c and the fourth temperature sensor 13d, respectively, both of which have detected the lowest temperatures, and consequently, the output current levels for the third charging circuit 12c and the fourth charging circuit 12d become the highest.

In third and subsequent distribution ratio calculations, the distribution ratios are calculated in a similar manner to that of the second distribution ratio calculation. That is, the output current level for the charging circuit 12 located closest to a location where the temperature is relatively high (temperature sensor 13 having detected a relatively high temperature) is relatively low. The output current level for the charging circuit 12 located closest to a location where the temperature is relatively low (temperature sensor 13 having detected a relatively low temperature) is relatively high. As a matter of course, as illustrated in FIG. 4, in two or more locations where the same temperature has been detected, the output current levels for the charging circuits 12 located closest to those locations are also the same as each other.

Embodiment 2

Figure 5:
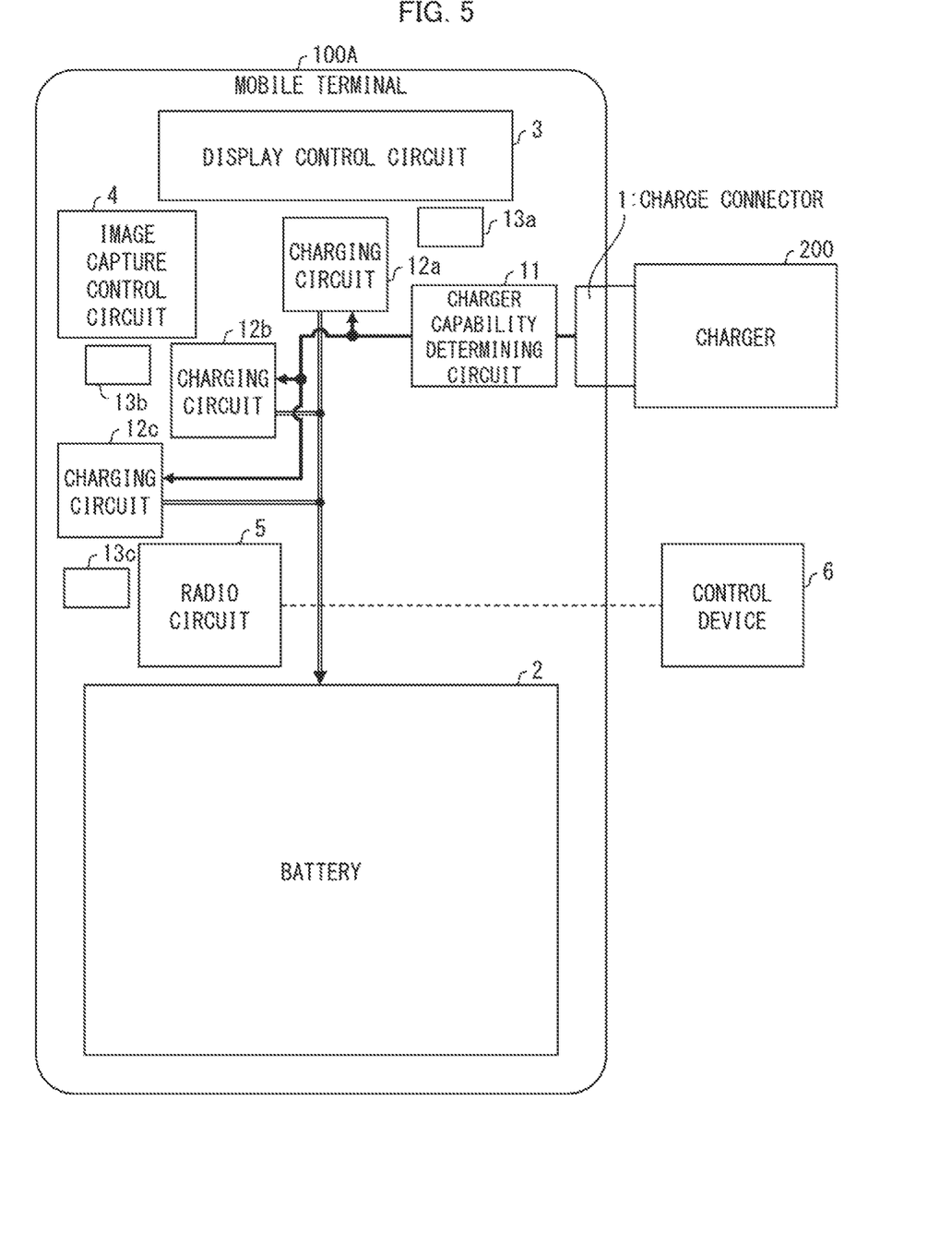
FIG. 5 is a block diagram illustrating another example internal configuration of the mobile terminal.

The following description will discuss another embodiment in accordance with the present invention with reference to FIG. 5. Note that members having functions identical to those of members discussed in Embodiment 1 are, for convenience, given the same reference signs, and descriptions of such members are omitted. FIG. 5 is a block diagram illustrating another example internal configuration of a mobile terminal 100A.

The mobile terminal 100A has the same functions and configuration as those of the mobile terminal 100, but is different from the mobile terminal 100 in that the mobile terminal 100A does not include the control device 6, the fourth charging circuit 12d, and the fourth temperature sensor 13d, as illustrated in FIG. 5. That is, in Embodiment 2, the control device 6 is realized as an external device which is provided outside the mobile terminal 100A and is connected communicably to the mobile terminal 100A. In this case, the control device 6 obtains, via the radio circuit 5, temperature data indicative of temperatures detected by the first temperature sensor 13a to the third temperature sensor 13c, and transmits, to the charger capability determining circuit 11, distribution ratio data indicative of distribution ratios calculated based on the temperature data. That is, the control device 6 outside the mobile terminal 100A adjusts, in accordance with temperatures detected at a plurality of locations in the mobile terminal 100A, output current levels for the first charging circuit 12a to the third charging circuit 12c, in order not to limit the operation of the mobile terminal 100A.

[Software Implementation Example]

Control blocks of the control device 6 (particularly, the current level adjusting section 61) can be realized by a logic circuit (hardware) provided in an integrated circuit (IC chip) or the like or can be alternatively realized by software.

In the latter case, the control device 6 includes a computer that executes instructions of a program that is software realizing the foregoing functions. The computer, for example, includes at least one processor (control device) and at least one computer-readable storage medium storing the program. An object of the present invention can be achieved by the processor of the computer reading and executing the program stored in the storage medium. Examples of the processor encompass a central processing unit (CPU). Examples of the storage medium encompass a "non-transitory tangible medium" such as a read only memory (ROM), a tape, a disk, a card, a semiconductor memory, and a programmable logic circuit. The computer may further include a random access memory (RAM) or the like in which the program is loaded. Further, the program may be supplied to or made available to the computer via any transmission medium (such as a communication network and a broadcast wave) which allows the program to be transmitted. Note that an aspect of the present invention can also be achieved in the form of a computer data signal in which the program is embodied via electronic transmission and which is embedded in a carrier wave.

Aspects of the Present Invention can Also be Expressed as Follows:

A control device in accordance with a first aspect of the present invention is a control device for controlling supply of currents to a battery, including: a current level adjusting section configured to adjust, in accordance with temperatures detected at a plurality of locations in an electronic device which includes the battery and a plurality of charging circuits, output current levels of output currents to be outputted from the respective plurality of charging circuits, the plurality of charging circuits each being configured to charge the battery.

Further, in a second aspect of the present invention, the control device can be arranged such that, in the first aspect of the present invention, the current level adjusting section is configured to adjust the output current levels such that (i) a charging circuit out of the plurality of charging circuits, which charging circuit is located closest to a location where the temperature is relatively high, outputs a relatively low level of output current and (ii) a charging circuit out of the plurality of charging circuits, which charging circuit is located closest to a location where the temperature is relatively low, outputs a relatively high level of output current.

Still further, in a third aspect of the present invention, the control device can be arranged such that, in the first or second aspect of the present invention, the current level adjusting section is configured to: calculate temperature ratios, which are ratios of the temperatures with respect to an average value of the temperatures; calculate distribution ratios of currents to be distributed to the charging circuits, which ratios are ratios of reciprocals of the temperature ratios with respect to a sum of the reciprocals of the temperature ratios; and adjust the output current levels in accordance with the distribution ratios of the currents.

Yet further, an electronic device in accordance with a fourth aspect of the present invention includes: a battery; a plurality of charging circuits; a plurality of components being heat sources; a plurality of temperature detecting sections, provided in vicinities of at least two of the plurality of components, configured to detect temperatures of areas surrounding the plurality of temperature detecting sections; and a control device recited in any one of the first to third aspects, the control device being configured to adjust output current levels in accordance with detection results obtained from the respective plurality of temperature detecting sections.

Further, a control method in accordance with a fifth aspect of the present invention is a control method of controlling supply of currents to a battery, including the steps of: (a) detecting temperatures at a plurality of locations in an electronic device which includes the battery and a plurality of charging circuits, the plurality of charging circuits each being configured to charge the battery; and (b) adjusting, in accordance with the temperatures having been detected in the step (a), current levels of output currents to be outputted from the respective plurality of charging circuits.

A control device in accordance with the foregoing aspects of the present invention may be realized by a computer. In this case, the present invention encompasses: a control program for the control device which program causes a computer to operate as the foregoing sections (software elements) of the control device so that the control device can be realized by the computer; and a computer-readable storage medium storing the control program therein.

Further, the present invention can be expressed as follows: That is, a charging system (electronic device) in accordance with an aspect of the present invention includes: a plurality of charging circuit sections (charging circuits) including current limiting sections (current limiting circuits); a plurality of temperature sensors; and a control section (control device), wherein charging amounts of the respective charging circuits are controlled in accordance with temperatures detected by the temperature sensors.

[Additional Remarks]

The present invention is not limited to the embodiments, but can be altered by a skilled person in the art within the scope of the claims. The present invention also encompasses, in its technical scope, any embodiment derived by combining technical means disclosed in differing embodiments. Further, it is possible to form a new technical feature by combining the technical means disclosed in the respective embodiments.

REFERENCE SIGNS LIST

2: Battery (battery, component)
3: Display control circuit (component)
4: Image capture control circuit (component)
5: Radio circuit (component)
6: Control device (control device, component)
11: Charger capability determining circuit (component)
61: Current level adjusting section
12: Charging circuit (charging circuit, component)
12a to 12d: First to fourth charging circuits (charging circuits, components)
13: Temperature sensors (temperature detecting sections)
13a to 13d: First to fourth temperature sensors (temperature detecting sections, components)
100, 100A: Mobile terminal (electronic device)

The invention claimed is:

1. A control device for controlling supply of currents to a battery, comprising:
a current level adjusting section configured to adjust, in accordance with temperatures detected at a plurality of locations in an electronic device which includes the battery and a plurality of charging circuits, output current levels of output currents to be outputted from the respective plurality of charging circuits, the plurality of charging circuits each being configured to charge the battery,
wherein the current level adjusting section is configured to adjust the output current levels such that (i) a charging circuit out of the plurality of charging circuits, which charging circuit is located closest to a location where the temperature is relatively high, outputs a relatively low level of output current and (ii) a charging circuit out of the plurality of charging circuits, which charging circuit is located closest to a location where the temperature is relatively low, outputs a relatively high level of output current.

2. A control device for controlling supply of currents to a battery, comprising:
a current level adjusting section configured to adjust, in accordance with temperatures detected at a plurality of locations in an electronic device which includes the battery and a plurality of charging circuits, output current levels of output currents to be outputted from the respective plurality of charging circuits, the plurality of charging circuits each being configured to charge the battery,
wherein the current level adjusting section is configured to:
calculate temperature ratios, which are ratios of the temperatures with respect to an average value of the temperatures;
calculate distribution ratios of currents to be distributed to the charging circuits, which ratios are ratios of reciprocals of the temperature ratios with respect to a sum of the reciprocals of the temperature ratios; and
adjust the output current levels in accordance with the distribution ratios of the currents.

3. An electronic device, comprising:
a battery;

a plurality of charging circuits;

a plurality of components being heat sources;

a plurality of temperature detecting sections, provided in vicinities of at least two of the plurality of components, configured to detect temperatures of areas surrounding the plurality of temperature detecting sections; and a control device recited in claim 1, the control device being configured to adjust output current levels in accordance with detection results obtained from the respective plurality of temperature detecting sections.

4. A method of controlling supply of currents to a battery, comprising:

(a) detecting temperatures at a plurality of locations in an electronic device which includes the battery and a plurality of charging circuits, the plurality of charging circuits each being configured to charge the battery; and (b) adjusting, in accordance with the temperatures having been detected in (a), current levels of output currents to be outputted from the respective plurality of charging circuits, wherein, in (b), the current levels are adjusted such that (i) a charging circuit out of the plurality of charging circuits, which charging circuit is located closest to a location where the temperature is relatively high, outputs a relatively low level of output current and (ii) a charging circuit out of the plurality of charging circuits, which charging circuit is located closest to a location where the temperature is relatively low, outputs a relatively high level of output current.

* * * * *